(12) United States Patent
Wade

(10) Patent No.: US 6,936,164 B2
(45) Date of Patent: Aug. 30, 2005

(54) ROTARY DRUM RAINHEAD

(76) Inventor: Rodney George Wade, 148 Wongawallen Drive, Upper Coomera, Queensland, 4210 (AU)

( * ) Notice: Subject to any disclaimer, the term of this patent is extended or adjusted under 35 U.S.C. 154(b) by 68 days.

(21) Appl. No.: 10/698,447

(22) Filed: Nov. 3, 2003

(65) Prior Publication Data

US 2004/0118760 A1 Jun. 24, 2004

(30) Foreign Application Priority Data

Nov. 1, 2002 (AU) .................................. 2002952421

(51) Int. Cl.[7] .................................................. E04D 13/076
(52) U.S. Cl. .................... 210/157; 210/159; 210/161; 210/402; 52/12; 52/16
(58) Field of Search ................. 210/154, 156, 210/157, 170, 158, 159, 161, 402; 52/11, 12, 16

(56) References Cited

U.S. PATENT DOCUMENTS

| | | | | | |
|---|---|---|---|---|---|
| 510,515 | A | * | 12/1893 | McKenney | 52/16 |
| 1,266,331 | A | * | 5/1918 | Schwinger | 210/157 |
| 2,056,445 | A | * | 10/1936 | Damman | 210/157 |
| 3,527,349 | A | * | 9/1970 | Lynch | 210/156 |
| 4,253,281 | A | * | 3/1981 | Ruttenberg | 52/12 |
| 4,615,153 | A | * | 10/1986 | Carey | 52/12 |
| 4,709,516 | A | * | 12/1987 | Gleaves | 52/16 |
| 4,801,377 | A | * | 1/1989 | Bolt | 52/12 |
| 5,526,612 | A | * | 6/1996 | Wade | 52/12 |
| 5,709,051 | A | * | 1/1998 | Mazziotti | 52/12 |
| 5,985,158 | A | * | 11/1999 | Tiderington | 52/12 |
| 6,263,618 | B1 | * | 7/2001 | Jones | 52/12 |
| 6,497,816 | B2 | * | 12/2002 | Naddy | 52/12 |
| 6,705,049 | B2 | * | 3/2004 | Esmond et al. | 210/154 |
| 2003/0051414 | A1 | * | 3/2003 | Bessette | 52/16 |

FOREIGN PATENT DOCUMENTS

| | | | |
|---|---|---|---|
| CA | 2206414 | * | 12/1999 |
| DE | 44 23 251 | * | 1/1996 |
| JP | 8-100499 | * | 4/1996 |

* cited by examiner

*Primary Examiner*—Christopher Upton
(74) *Attorney, Agent, or Firm*—Millen, White, Zelano & Branigan, P.C.

(57) ABSTRACT

A device for separating debris and other material from rainwater as it flows into a downpipe from a roof gutter is disclosed. The device has a compartment for fitting to the upper end of a downpipe. The compartment has a horizontally pivoted perforated drum which rotates when rainwater and entrained debris from an overhead gutter impinges on it such that the rainwater passes through the perforations in the drum into the associated downpipe and the debris is ejected outside of the device by the rotation of the drum.

12 Claims, 2 Drawing Sheets

ROTARY DRUM RAINHEAD

FIELD OF THE INVENTION

This invention relates to a device for separating debris and other such material from rainwater as it flows into a downpipe from a roof gutter.

BRIEF DESCRIPTION OF THE PRIOR ART

Many forms of separating devices have been developed over the years for this purpose. These devices generally rely upon fixed screens such as described in my earlier Australian Patent No. 629139. Although my earlier separating device is very effective in operation, there has developed a need to provide a separating device which is more self-cleaning.

OBJECT OF THE INVENTION

It is therefore an object of the invention to provide a separating device for the aforementioned purpose which is self-cleaning.

SUMMARY OF THE INVENTION

Accordingly, the present invention provides a device for separating debris and other such material from rainwater as it flows into a downpipe from a roof gutter, said device comprising a compartment for fitting to the upper end of a downpipe, which compartment includes a horizontally pivoted perforated rotary drum which is designed to rotate when rainwater and entrained debris from an overhead gutter impinges on it such that the rainwater passes through the perforations in the drum into the associated downpipe and the debris is ejected outside of the device by the rotation of the drum.

By the term "upper end of the downpipe" is meant an upwardly opening end which may be at the top of the downpipe or at any location between the top and bottom, which has been formed by removing an intermediate section to leave one part with an upwardly opening end and another with a downwardly opening end. That is, the device may be located in any region of the downpipe but for maximum effectiveness it should be located adjacent to the gutter at the top end. The reason for this is that a large size outlet can be made in the gutter, which can be bigger than the diameter of the downpipe in the case of a downpipe with a circular transverse cross section or bigger in size than the downpipe transverse cross sectional size in the case of the downpipe having a rectangular transverse cross section, to enable extra large objects such as twigs, dead birds and other such large items to pass out of the gutter, which would not fit into a conventionally sized downpipe.

The outlet in the bottom wall of the gutter can include a rainwater flow guide which directs the water and debris onto the top surface of the rotary drum at a position past the central vertical axis of the drum such that the drum is caused to rotate in a direction which ejects the debris away from the device. Alternatively, a rainwater flow guide can be incorporated as an integral feature of the top wall of the compartment. Preferably, the bottom edge of the rainwater flow guide terminates only a few centimetres from the top of the rotary drum.

The rotary drum will generally take the form of a hollow cylinder with supporting end walls or spokes through which the horizontal axle upon which the drum rotates, extends. The surface of the drum can be formed from mesh, blades, perforated material or the like. Preferably it is formed from wire or plastic mesh. Metal and coated metal screens are preferred as they are less prone to damage and are longer wearing. Preferred metal screens are welded or wire woven stainless steel, zincalum, galvanized steel, brass, copper and fibreglass mesh. The mesh type and size will depend on the application. For large size items welded galvanized steel mesh may be adequate whereas woven stainless steel may be most appropriate for small items. Generally, however, for the majority of general purpose locations, the mesh size will be one of the standard sizes of 5 mm, 7 mm, 9 mm or 12.5 mm.

A discharge shute is suitably included in the lower portion of the compartment to direct the screened water into the upper end of the downpipe. The discharge shute is preferably shaped and tapered so as to wedge into the downpipe to facilitate placement. To this end, it will have a conical or pyramidal shape depending on whether the downpipe is circular or rectangular in cross-section.

The compartment preferably has a rectangular outer dimension with an inclined lower wall which opens into the discharge shute. It can be fixed in position to the fascia which supports the gutter, or to the wall of the building, by screws or the like which pass through a backing panel formed integrally with, or joined to, the rear wall of the compartment.

In use, water with entrained debris passages from the gutter and is directed by the flow guide onto the top of the perforated rotary drum. The angle at which the water and debris impinges on the rotary drum causes the drum to rotate. The perforations are designed to prevent the passage of the debris therethrough but to permit the water to passage into the drum. The debris is ejected from the surface of the drum as it rotates and the water flows downwardly through the bottom wall of the drum and on into the top of the attached downpipe for discharge.

BRIEF DESCRIPTION OF THE DRAWINGS

A preferred embodiment of the invention will now be described with reference to the accompanying drawings, in which.

DETAILED DESCRIPTION OF PREFERRED EMBODIMENTS

Figure 1:
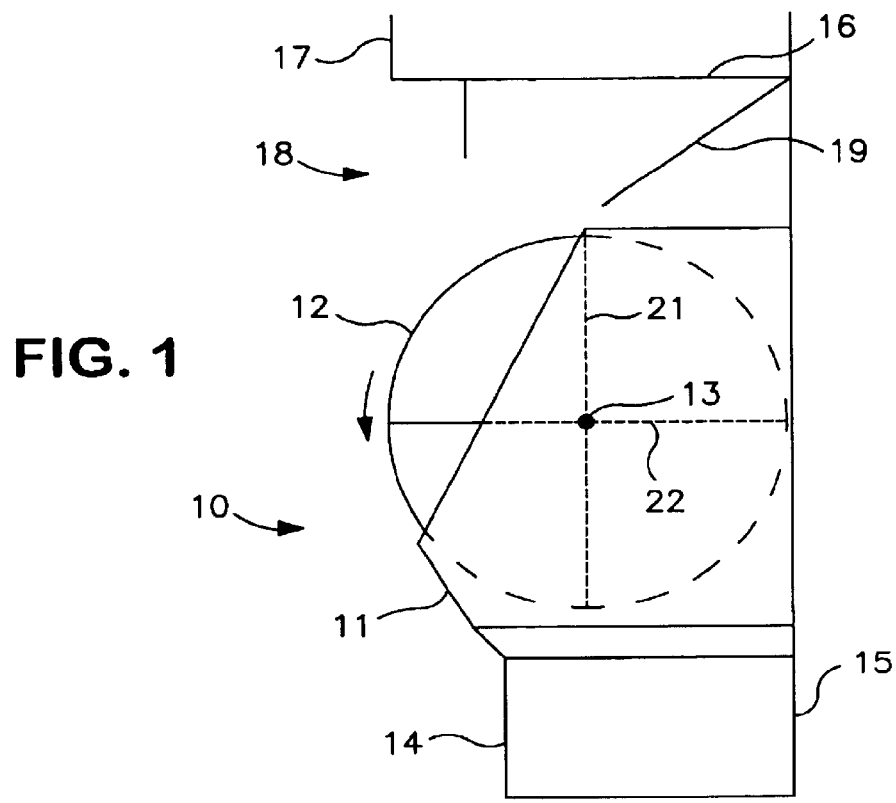
FIG. 1 is a schematic side-elevation of a separating device according to the present invention.
Figure 2:
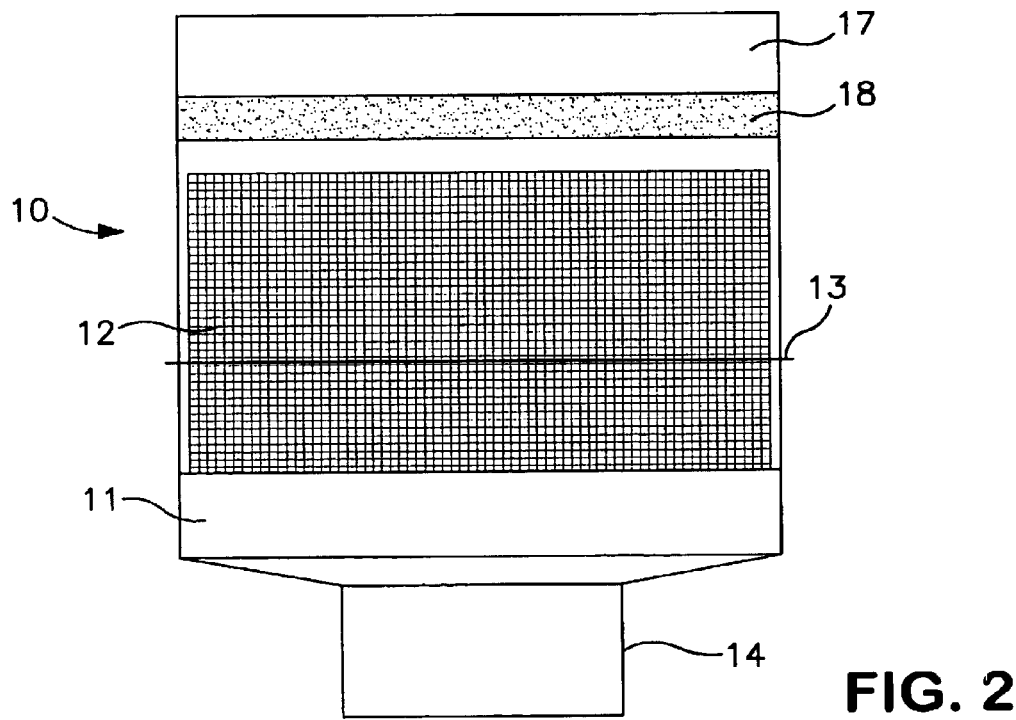
FIG. 2 is a schematic front-elevation of the separating device shown in FIG. 1.

In each of the drawings, like reference numerals refer to like parts.

The separator device 10 comprises a compartment 11 with a perforated rotary screen 12 which is adapted for rotation in a horizontal plane about axle 13 extending through opposing side walls of the compartment.

The compartment 11 is fitted to the upper end of a downpipe 14 and is secured to a fascia 15 by pins. The compartment 11 is located immediately below an opening 16 in a gutter 17, about which opening a rainwater flow guide 18 is formed. The rainwater flow guide 18 has a sloping rear wall 19 which directs water and debris onto the top surface of the rotary drum 12 at a position past the central vertical axis 20 of the rotary drum.

The rotary drum 12 has a wire mesh surface with square openings. It is supported on a framework which includes radial members 21, 22 passing through the central horizontal axle 13. The axle 13 is a solid plastics or metal rod which enables free rotation of the drum.

In operation, rainwater and debris passes from the gutter 17 through the opening 16 downwardly into the flow guide 18. Here it is directed onto the top surface of the rotary drum 12 so as to cause the drum to rotate in the direction indicated by the arrow. Upon rotation debris which is larger than the mesh size of the screen is ejected away from the rotating drum while the rainwater continues on downwardly through the drum and into the downpipe 14.

In this manner a self-cleaning rain head is provided which meets the objective of the invention.

Figure 3:
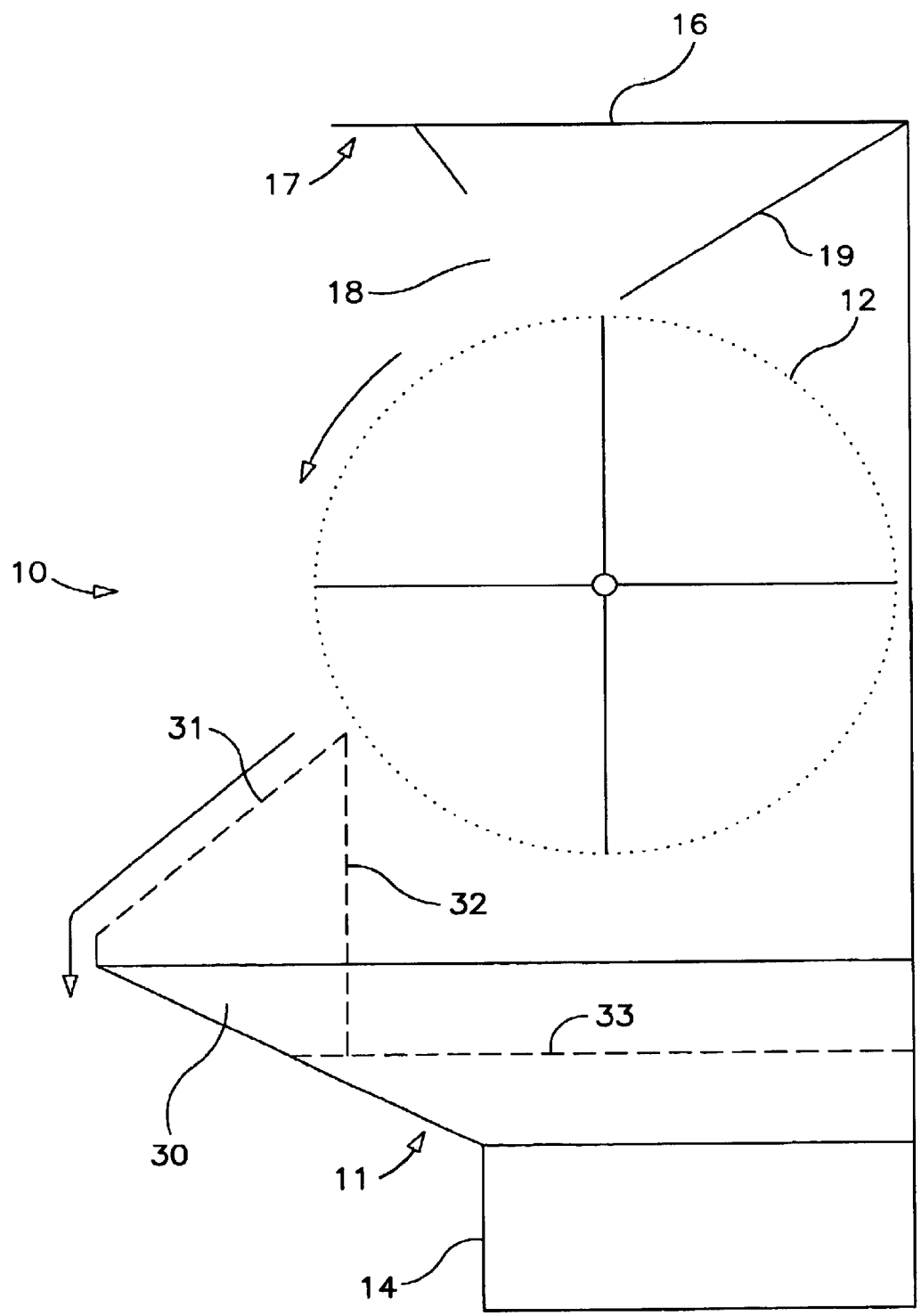
FIG. 3 is a schematic side-elevation of a separating device according to a second embodiment of the invention.

The device of FIG. 3 is similar to the device of FIG. 1 and like numerals have been used to denote like components to that shown in FIG. 1.

The device 10 has a compartment 11 fitted to an upper end of a downpipe 14. The compartment 11 is located immediately below opening 16 in a gutter 17 about which opening a rainwater flow guide 18 is formed. The guide 18 has a sloping rear wall 19 which directs water and debris onto the top surface of the rotary drum 12. Side extension 30 ensures that the compartment 11 extends beyond the drum 12. A screen 31 extends between the outer extremity of the extension 30 and the drum 12 and ensures that any water that does not pass through the drum may still enter the downpipe 14. Any debris directed onto the screen 31 is either washed from the screen or is free to be blown off the screen by the force of any wind acting on the screen.

The screen 31 may have a mesh size of 6 mm.

A support 32 may extend from a location on the extension 30 to an edge of the screen 31. An optional screen 33 may extend across the compartment 11 and above the downpipe 14.

Whilst the above has been given by way of illustrative example of the invention, many modifications and variations may be made thereto by persons skilled in the art without departing from the broad scope and ambit of the invention as herein set forth.

What is claimed is:

1. A device for separating debris and other such material from rainwater as it flows into a downpipe from a roof gutter, said device comprising a compartment constructed and arranged for fitting to the upper end of a downpipe, which compartment includes a pair of opposing sidewalls supporting a horizontally pivoted perforated rotary drum which rotates when rainwater and entrained debris from an overhead gutter impinges on it such that the rainwater passes through the perforations in the drum into the associated downpipe and the debris are ejected outside of the compartment by the rotation of the drum.

2. The device of claim 1 wherein the overhead gutter has an outlet through which water flows onto the drum, the outlet has a water guide for directing water and debris onto the top surface of the drum at a location past a central vertical axis of the drum to thereby cause the drum rotate.

3. The device of claim 1 wherein the compartment includes a water guide for directing water and debris onto the top surface of the drum at a location past a central vertical axis of the drum to thereby cause the drum to rotate.

4. The device of claim 1 wherein the rotary drum comprises a hollow cylinder with supporting end walls or spokes through which a horizontal axle upon which the drum rotates and extends.

5. The device of claim 4 wherein the surface of the drum is formed from mesh, blades or perforated material.

6. The device of claim 5 wherein the surface of the drum is formed from wire or plastic mesh.

7. The device of claim 5 wherein the mesh is formed from metal or coated metal screens.

8. The device of claim 5 wherein the openings in the mesh are between 5 mm to 12 mm in size.

9. The device of claim 1 including a discharge chute located in the lower portion of the compartment to direct screened water into the upper end of the downpipe.

10. The device of claim 9 wherein the discharge chute shaped and tapered to be received into the downpipe.

11. The device of claim 10 wherein the discharge chute is either conical or pyramidal in shape.

12. The device of claim 9 wherein the compartment has a rectangular outer shape with an inclined lower wall which opens into the discharge chute.

* * * * *

UNITED STATES PATENT AND TRADEMARK OFFICE
CERTIFICATE OF CORRECTION

PATENT NO. : 6,936,164 B2
DATED : August 30, 2005
INVENTOR(S) : Rodney George Wade It is certified that error appears in the above-identified patent and that said Letters Patent is hereby corrected as shown below:

<u>Title page,</u>
Item [76], Inventor, "Wade, 148 Wongawallen Drive, Upper Coomera, Queensland, 4210 (AU)" should read -- Wade, Upper Coomera, Queensland (AU) --.

<u>Column 4,</u>
Line 12, reads "drum, the" should read -- drum, and the --.
Line 15, reads "drum rotate." should read -- drum to rotate. --.
Line 35, reads "discharge chute" should read -- discharge chute is --.

Signed and Sealed this

Twenty-fifth Day of April, 2006

JON W. DUDAS
*Director of the United States Patent and Trademark Office*